United States Patent
Biehlmann et al.

(10) Patent No.: US 11,610,005 B2
(45) Date of Patent: Mar. 21, 2023

(54) CRYPTOGRAPHIC OBJECT MANAGEMENT ACROSS MULTIPLE REMOTE SITES

(71) Applicant: ENTRUST CORPORATION, Shakopee, MN (US)

(72) Inventors: Christophe Biehlmann, Shakopee, MN (US); Kent Landerholm, Shakopee, MN (US); Vishal Arora, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 169 days.

(21) Appl. No.: 17/337,078

(22) Filed: Jun. 2, 2021

(65) Prior Publication Data

US 2021/0342456 A1 Nov. 4, 2021

Related U.S. Application Data

(63) Continuation of application No. 15/992,993, filed on May 30, 2018, now Pat. No. 11,030,328.
(Continued)

(51) Int. Cl.
*H04L 29/06* (2006.01)
*G06F 21/60* (2013.01)
(Continued)

(52) U.S. Cl.
CPC .......... *G06F 21/602* (2013.01); *H04L 9/0894* (2013.01); *H04L 9/0897* (2013.01); *H04L 63/104* (2013.01); *H04L 63/168* (2013.01)

(58) Field of Classification Search
CPC .... G06F 21/602; H04L 9/0894; H04L 63/168
See application file for complete search history.

(56) References Cited

U.S. PATENT DOCUMENTS

| 4,825,054 A | 4/1989 | Rust et al. |
| 5,266,781 A | 11/1993 | Warwick et al. |

(Continued)

FOREIGN PATENT DOCUMENTS

| CA | 2568990 A1 | 12/2005 |
| CN | 105681027 A | 6/2016 |

(Continued)

OTHER PUBLICATIONS

J. Seol, S. Jin, D. Lee, J. Huh and S. Maeng, "A Trusted IaaS Environment with Hardware Security Module," in IEEE Transactions on Services Computing, vol. 9, No. 3, pp. 343-356, May 1-Jun. 2016, doi: 10.1109/TSC.2015.2392099. (Year: 2015).*

(Continued)

*Primary Examiner* — Shawnchoy Rahman
(74) *Attorney, Agent, or Firm* — Hamre, Schumann, Mueller & Larson, P.C.

(57) ABSTRACT

A cryptographic object management system is provided that includes physically separated first and second object management sites. The first and second object management sites each respectively include HSMs, a HSM server connected to each of the HSMs, and a persistent layer connected to the HSM server. The HSM servers respectively manage operation of each of the HSMs. The HSM server of the first object management site includes an object manager module that manages and controls the cryptographic object management system. The persistent layers respectively store cryptographic objects for use by the HSMs. Each of the HSMs respectively performs crypto-processing on one or more of the cryptographic objects.

14 Claims, 4 Drawing Sheets

Related U.S. Application Data

(60) Provisional application No. 62/513,908, filed on Jun. 1, 2017, provisional application No. 62/513,357, filed on May 31, 2017.

(51) Int. Cl.
*H04L 9/08* (2006.01)
*H04L 9/40* (2022.01)

(56) References Cited

U.S. PATENT DOCUMENTS

| | | |
|---|---|---|
| 6,588,673 B1 | 7/2003 | Chan et al. |
| 6,783,067 B2 | 8/2004 | Kreuter et al. |
| 6,902,107 B2 | 6/2005 | Shay et al. |
| 7,085,386 B2 * | 8/2006 | Audebert ............ H04L 9/0877 380/278 |
| 7,278,582 B1 | 10/2007 | Siegel et al. |
| 7,398,972 B2 | 7/2008 | Schuller et al. |
| 7,434,728 B2 | 10/2008 | Paulson et al. |
| 9,652,911 B2 | 5/2017 | Fedronic et al. |
| 9,660,970 B1 | 5/2017 | Rubin et al. |
| 2009/0016534 A1 | 1/2009 | Ortiz Cornet et al. |
| 2012/0131354 A1 | 5/2012 | French |
| 2012/0278897 A1 | 11/2012 | Ang et al. |
| 2013/0039494 A1 | 2/2013 | Arnold et al. |
| 2013/0219164 A1 | 8/2013 | Hamid |
| 2015/0124608 A1 | 5/2015 | Agarwal et al. |
| 2015/0319166 A1 | 11/2015 | Arnold et al. |
| 2016/0105429 A1 * | 4/2016 | Boenisch ............ H04L 63/0853 713/171 |
| 2016/0164683 A1 | 6/2016 | Barney et al. |
| 2016/0241393 A1 | 8/2016 | Boenisch et al. |
| 2017/0222802 A1 * | 8/2017 | Rubin ................... H04L 9/0825 |

FOREIGN PATENT DOCUMENTS

| | | |
|---|---|---|
| TW | 201546649 A | 12/2015 |
| WO | 01/59720 A2 | 8/2001 |
| WO | 2008128212 A1 | 10/2008 |

OTHER PUBLICATIONS

De Souza, Túlio Cicero Salvaro, Jean Everson Martina, and Ricardo Felipe Custódio. "Audit and backup procedures for hardware security modules." Proceedings of the 7th Symposium on Identity and Trust on the Internet. 2008. (Year: 2008).*

International Search Report and Written Opinion issued in PCT/US2018/035112, dated Sep. 21, 2018.

Partial Supplementary European Search Report, European Patent Application No. 18810685.0, dated Oct. 20, 2020 (13 pages).

Office Action, Chinese Patent Application No. 201880034783.1, dated Apr. 6, 2022 (12 pages).

* cited by examiner

CRYPTOGRAPHIC OBJECT MANAGEMENT ACROSS MULTIPLE REMOTE SITES

FIELD

This disclosure relates to a systems and methods for cryptographic object management across multiple remote sites.

BACKGROUND

EMV is a payment system specification for credit/debit chip cards and devices designed to perform credit/debit transactions using these chip cards. The EMV specification was jointly developed and maintained by Europay International, Mastercard International, and Visa International (hence, "EMV"). The stated purpose of the EMV specification is to ensure worldwide interoperability between the chip cards and any terminal used in the credit/debit transactions. The process of personalizing an EMV credential, such as credit cards, is referred to as issuance and is the function of an EMV issuance system. EMV issuance typically involves the use of a cryptographic management system.

SUMMARY

This disclosure relates to a systems and methods for cryptographic object management across multiple remote sites.

The embodiments described herein can securely store cryptographic object material off-token in a persistent layer and rely on a Hardware Security Module (HSM) for crypto-processing. This can expand HSM capacity without impacting cryptographic object management of, for example, EMV issuance.

The embodiments described herein can also provide load balancing pools for creating affinity of cryptographic object management systems (e.g., EMV Issuance Systems). This can help mitigate issues relating to geographical segregation of HSMs and can help to manage latency and reduce runtime access failures. These embodiments can provide replication of the persistent layer to local copies of cryptographic object material and load balancing pools without any centralized (manual) management of production sites in order to improve availability of the cryptographic object management system and can enable disaster recovery. Replicated cryptographic object material can also allow immediate and automatic access from all HSMs and cryptographic object management systems as soon as it is populated in the local copy of the persistent layer.

The embodiments described herein can be used with standard Information Technology (IT) protocols, prevent cryptographic object material from being compromised, and reduce IT administration costs.

The embodiments described herein can also support virtually an unlimited number of tokens used for cryptographic object separation by storing the tokens in a persistent layer that can be imported by an HSM on demand. When an imported token is no longer used, the HSM can internally delete the imported token securely to allow other tokens to be imported. Accordingly, cryptographic object separation can be achieved through the management of virtual tokens stored in the persistent layer such and each virtual token can be protected by its own cryptographic object.

The embodiments described herein can be used in a card personalization system. The types of printing devices and subcomponents of a printing device (hereinafter referred to simply as the printing device) for card personalization can include, for example, a central card issuance system, a desktop card printer, a desktop embosser, a passport system, a desktop laminator, a desktop embosser, a smart card reader, an input and/or output card hopper, etc.

In one embodiment, a cryptographic object management system is provided that includes physically separated first and second object management sites. The first and second object management sites each respectively include HSMs, a HSM server connected to each of the HSMs, and a persistent layer connected to the HSM server. The HSM servers respectively manage operation of each of the HSMs. The HSM server of the first object management site includes an object manager module that manages and controls the cryptographic object management system. The persistent layers respectively store cryptographic objects for use by the HSMs. Each of the HSMs respectively performs crypto-processing on one or more of the cryptographic objects.

In another embodiment, a cryptographic object management system is provided. The system includes a first object management site and a second object management site that is physically separated from the first object management site. The first object management site includes a plurality of first HSMs, a first HSM server, and a first persistent layer. The first HSM server is connected to each of the first HSMs. The first HSM server manages and controls operation of each of the plurality of first HSMs. Also, the first HSM server includes an object manager module that manages and controls the cryptographic object management system. The first persistent layer is connected to the first HSM server and stores a plurality of first site cryptographic objects for use by the first HSMs. Each of the first HSMs performs crypto-processing on one or more of the plurality of first site cryptographic objects stored in the first persistent layer. The second object management site includes a plurality of second HSMs, a second HSM server, and a second persistent layer. The second HSM server is connected to each of the second HSMs. The second HSM server manages and controls operation of each of the plurality of second HSMs. The second persistent layer is connected to the second HSM server and stores a plurality of second site cryptographic objects for use by the second HSMs. Each of the second HSMs performs crypto-processing on one or more of the plurality of second site cryptographic objects stored in the second persistent layer.

DRAWINGS

DETAILED DESCRIPTION

Figure 1:
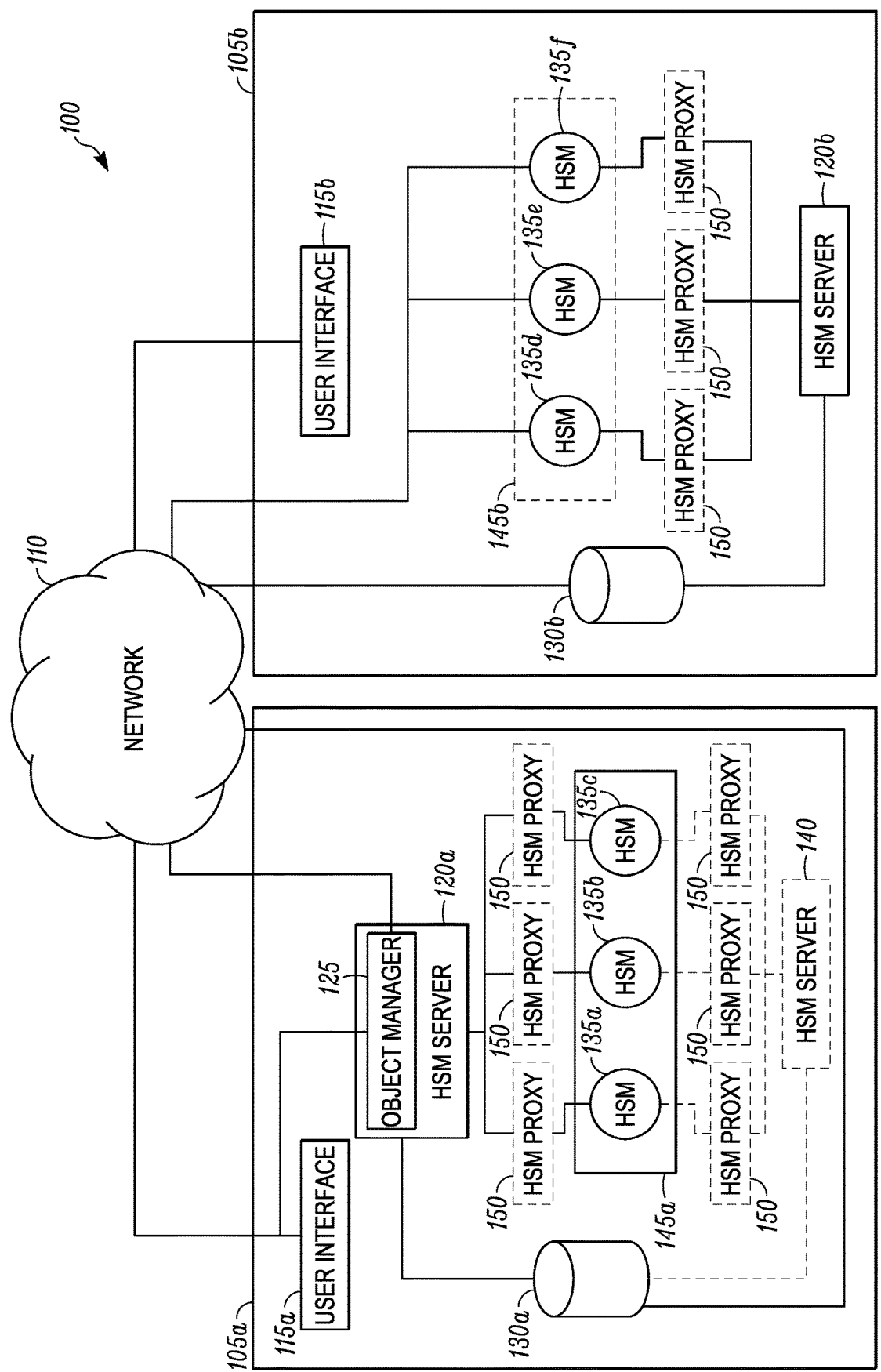
FIG. 1 illustrates a schematic diagram of a cryptographic object management system, according to one embodiment.

This disclosure relates to a systems and methods for cryptographic object management across multiple remote sites.

The embodiments described herein can securely store cryptographic object material off-token in a persistent layer and rely on a Hardware Security Module (HSM) for crypto-processing. This can expand HSM capacity without impacting cryptographic object management of, for example, EMV administration and management.

The embodiments described herein can also provide load balancing pools for creating affinity of cryptographic object management systems (e.g., EMV Issuance Systems). This can help mitigate issues relating to geographical segregation of HSMs and can help to manage latency and reduce runtime access failures. These embodiments can provide replication of the persistent layer to local copies of cryptographic object material and load balancing pools without any centralized (manual) management of production sites in order to improve availability of the cryptographic object management system and can enable disaster recovery. Replicated cryptographic object material can also allow immediate and automatic access from all HSMs and cryptographic object management systems as soon as it is populated in the local copy of the persistent layer.

The embodiments described herein can be used with standard Information Technology (IT) protocols, prevent cryptographic object material from being compromised, and reduce IT administration costs.

The embodiments described herein can also support virtually an unlimited number of tokens used for cryptographic object separation by storing the tokens in a persistent layer that can be imported by an HSM on demand. When an imported token is no longer used, the HSM can internally delete the imported token securely to allow other tokens to be imported. Accordingly, cryptographic object separation can be achieved through the management of virtual tokens stored in the persistent layer such and each virtual token can be protected by its own cryptographic object.

The embodiments described herein can be used in a card personalization system. The types of printing devices and subcomponents of a printing device (hereinafter referred to simply as the printing device) for card personalization can include, for example, a central card issuance system, a desktop card printer, a desktop embosser, a passport system, a desktop laminator, a desktop embosser, a smart card reader, an input and/or output card hopper, etc.

Card personalization systems can be designed for relatively small scale, individual document personalization and production. In these systems, a single document to be personalized is input into a processing machine, which typically includes one or two personalization/processing capabilities, such as printing and laminating. These processing machines are often termed desktop processing machines because they have a relatively small footprint intended to permit the processing machine to reside on a desktop. Many examples of desktop processing machines are known, such as the SD or SP family of desktop card printers available from DataCard Corporation of Minnetonka, Minn. Other examples of desktop processing machines are disclosed in U.S. Pat. Nos. 7,434,728 and 7,398,972, each of which is incorporated herein by reference in its entirety.

For large volume batch production of personalized documents, institutions often utilize systems that employ multiple processing stations or modules to process multiple documents at the same time to reduce the overall per document processing time. Examples of such systems are disclosed in U.S. Pat. Nos. 4,825,054, 5,266,781 and its progeny, U.S. Pat. Nos. 6,783,067, and 6,902,107, all of which are incorporated herein by reference in their entirety. As with desktop document processing machines, batch processing systems also include printing and laminating capabilities.

A cryptographic object, as defined herein, refers to cryptographic material that can be used for secure communication. Examples of a cryptographic object can include, for example, a cryptographic token, a cryptographic secret key, a cryptographic public key, a cryptographic private key, a cryptographic certificate, a decimalization table, a weak PIN list, operator group lists, etc. In some embodiments, the cryptographic objects can be used to facilitate the generation of personalization data on an EMV document (e.g., a smart chip card).

A cryptographic token, as defined herein, refers to a collection of cryptographic objects protected under a particular security context. The security context can be established when a cryptographic token is created (e.g., initialized). In the embodiments described herein, this can be done by assigning a user group and/or a security officer group to the token. Changing the contents of a token can require members of the user or security officer group (depending on their access level) to first authenticate before making the change. Accordingly, authentication can be required in order to create, modify or remove a cryptographic object in a token.

An operator token, as defined herein, refers to a secure container for runtime use of a virtual token and its associated cryptographic objects. In the embodiments described herein, the operator token can be created on and stored in a hardware security module (HSM)

A virtual token, as defined herein, refers to a cryptographic token stored in a persistent layer. In the embodiments described herein, a virtual token is loaded and decrypted in an operator token in order to be used. A virtual token can be mapped to any operator token and is not fixed to a particular operator token. Accordingly, a virtual token can be decrypted and used with a first operator token during one session and in another session the virtual token can be decrypted and used with a second operator token during a second session.

A HSM, as defined herein, refers to a physical computing device that safeguards and manages cryptographic objects for storing authentication and providing crypto-processing.

A HSM server, as defined herein, can refer to software loaded onto a preexisting server machine, a server machine preloaded with software during manufacturing of the server machine, and software run by one or more virtual server machines. The software manages and controls operation of each of a plurality of HSMs, as described herein. In some embodiments, the software includes an object manager module that manages and controls a cryptographic object management system. In some embodiments, the software runs the object manager module.

FIG. 1 illustrates a schematic of a cryptographic object management system 100, according to one embodiment. The cryptographic object management system 100 can be, for example, an EMV Issuance system that allows an operator to issue and produce EMV cards. The cryptographic object management system 100 includes a plurality of object management sites 105 that are connected via a network 110. The embodiment shown in FIG. 1 shows a primary object management site 105*a* and a secondary object management site 105*b*.

The primary object management site 105*a* and the secondary object management site 105*b* can be at physically separate locations and can be configured to operate independently. It will be appreciated that in other embodiments, the cryptographic object management system 100 can include three or more object management sites 105. When the cryptographic object management system 100 is an EMV Issuance System, either of the object management sites 105*a,b* can be used to produce an EMV document. In some embodiments, an operator can choose whether the primary object management site 105a or the secondary object management site 105b is to be used.

The primary object management site 105a includes an object management user interface 115a, a primary site HSM server 120a with an object manager module 125, a persistent layer 130a, and a plurality of HSMs 135a-c. In some embodiments, the primary object management site 105a can also include one or more optional HSM servers 140. The plurality of HSMs 135a-c is grouped together into a primary load balancing pool 145a. The secondary object management site 105b includes an object management user interface 115b, a secondary site HSM server 120b, a persistent layer 130b, and a plurality of HSMs 135d-f. The plurality of HSMs 135d-f is grouped together into a secondary load balancing pool 145b.

As shown in FIG. 1, the object management user interfaces 115a,b can communicate with the object manager module 125 and can provide redundant access and management of cryptographic objects that are available to both of the object management sites 105a,b. In some embodiments, the object management user interface 115a can be configured to allow an operator to control and manage the primary object management site 105a. Also, in some embodiments, the object management user interface 115b can be configured to allow an operator to control and manage the secondary object management site 105b. In some embodiments, the object management user interfaces 115a,b can be a user interface accessed through, for example, a web browser. In some embodiments, the user interfaces 115a,b can allow an operator to view information about a selected HSM 135 (e.g., firmware version, model number, etc.).

The HSM servers 120 are connected to the plurality of HSMs 135. The primary HSM server 120a is connected to the HSMs 135a-c that are part of the load balancing pool 145a. In some embodiments, the primary server 120a is connected to the HSMs 135a-c via optional HSM proxies 150. The secondary HSM server 120b is connected to the HSMs 135d-f that are part of the load balancing pool 145b. In some embodiments, the secondary server 120b is connected to the HSMs 135d-f via optional HSM proxies 150. Each of the HSM proxies 150 can be responsible for handling communication with one HSM of the plurality of HSMs 135. This can allow the HSM proxies 150 to reconnect with a particular HSM 135 without interfering with the use of the other HSMs 135. The primary site HSM server 120a is configured to manage and control operation of the HSMs 135a-c.

The object manager module 125 of the primary site HSM server 120a is configured to manage and control the cryptographic object management system 100. In some embodiments, the object manager module 125 is a hardware device that is part of the HSM server 120a. In some embodiments, the object manager module 125 is a software application run by the primary site HSM server 120a. The object manager module 125 is connected to the object management user interfaces 115a,b. In some embodiments, the object manager module 125 can be used to manage the issuance of a financial document.

The object manager module 125 can communicate with and manage the HSMs 135a-c of the primary object management site 105a and communicate with and manage the HSMs 135d-f of the secondary object management site 105b. The object manager module 125 can introduce and manage cryptographic objects to be used in the cryptographic object management system 100. The object manager module 125 can introduce cryptographic objects by instructing one or more of the plurality of HSMs 135 to generate a new cryptographic object for the HSM 135. The object manager module 125 can also add or remove one or more HSMs 135 to one of the object management sites 105.

The object manger 125 can also provide maintenance to the HSMs 135, update firmware of each of the HSMs 135, and can add or remove one or more HSMs 135 to either of the object management sites 105a,b. In some embodiments, the object manager 125 can perform maintenance on one or more of the plurality of HSMs 135 while the remaining HSMs 135 are performing production/issuance activities.

In some embodiments, the object manager 125 can be bundled with one or more files having HSM firmware and certificate(s). This can improve usability and integrity of the cryptographic object management system 100 by allowing the appropriate file for a specific type or a particular HSM 135 to be automatically selected. Accordingly, an operator is not required to browse two or more file locations and select a version of a file appropriate for the specific type of or a particular HSM 135.

The persistent layers 130a,b are configured to store cryptographic objects typically stored in the HSMs 135. The persistent layers 130a,b can be, for example, a network storage device, a database, etc. A cryptographic object can include, for example, a cryptographic token, a cryptographic secret key, a cryptographic public key, a cryptographic private key, a cryptographic certificate, a decimalization table, a weak pin list, operator group lists, etc. The cryptographic objects stored in the persistent layers 130a,b (also referred to as persisted cryptographic objects) are encrypted. In some embodiments, the cryptographic objects can be stored in the persistent layers 130a,b as cryptograms. During operation of the cryptographic object management system 100, when a cryptographic object is required by one of the HSMs 135a-c, the persistent layer 130a is configured to provide the cryptographic object to the particular HSM 135a-c via the primary site HSM server 120a. Similarly, when a cryptographic object is required by one of the HSMs 135d-f, the persistent layer 130b is configured to provide the cryptographic object to the particular HSM 135d-f via the secondary site HSM server 120b.

The persistent layers 130a,b are also connected via the network 110. During operation of the cryptographic object management system 100, the persistent layers 130a,b can communicate to provide automatic replication of the persistent layers 130a,b. Accordingly, any addition of, removal of, or change made to a cryptographic object in the persistent layer 130a can be automatically replicated in the persistent layer 130b and vice versa. In some embodiments, the persistent layers 130a,b can undergo a complete automatic replication process. In other embodiments, the persistent layers 130a,b can undergo a partial automatic replication process as required by the cryptographic object management system 100. For example, it may be desirable to make only some of the cryptographic objects stored in persistent layer 130a available at site 105b. In these embodiments, a portion of the information stored in persistent layer 130a can be replicated and stored in persistent layer 130b. By making cryptographic objects available to each of the persistent layers 130a,b, the cryptographic object management system 100 can help meet disaster recovery requirements when one of the primary object management site 105a or the secondary object management site 105b is not working (e.g., during a power outage, routine maintenance, loss of network, natural or man-made disaster, etc.).

The plurality of HSMs 135 are configured to provide crypto-processing of cryptographic objects stored in the persistent layers 130*a,b*. Each of the HSMs 135 has a finite storage space. By storing the cryptographic objects in the persistent layers 130*a,b* rather than in the HSMs 135, the HSMs 135 can avoid running into storage capacity issues. The plurality of HSMs 135*a-c* share the persistent layer 130*a* and the plurality of HSMs 135*d-f* share the persistent layer 130*b*. Accordingly, the plurality of HSMs 135 can provide crypto-processing while not being required to provide persistent storage of cryptographic objects.

Also, any change to, addition or removal of a cryptographic object stored in one of the persistent layers 130*a,b* by the object manager module 125 results in the cryptographic object being automatically updated for each of the HSMs 135. That is, each of the HSMs 135 can have an automatic and real-time access to each of the cryptographic objects that have been added or updated to the persistent layers 130*a,b*. Accordingly, each of the HSMs 135 does not need to be updated when a cryptographic object is edited, added or removed.

In some embodiments, one or more of the plurality of HSMs 135 can be placed in a maintenance mode whereby the HSM 135 remains connected to one of the HSM servers 120,140 but is not used for production/issuance activities. Accordingly, the cryptographic object management system 100 can perform functions on one or more of the HSMs 135 (e.g., updating firmware, etc.) without having to stop production/issuance of the system 100. That is, even when one or more of the HSMs 135 are in maintenance mode, the remaining HSMs 135 can be operated as needed for production/issuance activities.

In some embodiments, one or more of the HSMs 135 can generate a cryptographic secret key and can export two or more components that form the cryptographic secret key outside of the HSM 135 while meeting industry specifications (e.g., Payment Card Industry (PCI) specifications). The cryptographic object management system 100 can also allow one or more of the HSMs 135 to receive the two or more components that form cryptographic private key and to combine the two or more components to obtain the cryptographic secret key while meeting industry specifications. In some embodiments, a device that may have no memory or internal processing (e.g., a dumb terminal) can be connected directly to one or more of the HSMs 135 to allow the HSM 135 to export the one or more components that form the cryptographic private key and to receive the one or more components that form the cryptographic private key. In some of these embodiments, an operator can specify the particular HSM 135 (e.g., the HSM 135 that is connected to a dumb terminal) to export or receive the one or more components that form the cryptographic private key.

The load balancing pools 145 allow configuration of affinity between an operator (e.g., user, security officer, etc.) of the HSMs 135 and a particular set of HSMs of the plurality of HSMs 135. Accordingly, activity of the HSMs 135 can be segregated based on, for example, network topology, maintenance needs, etc. The load balancing pools 145 can reduce lag time when multiple cryptographic objects are requested by the object manager module 125. For example, the HSM servers 120*a* and the optional HSM server 140 can choose which of the HSMs 135*a-c* is used for providing crypto-processing of each of the requested cryptographic objects stored in the persistent layer 130*a*. Similarly, the HSM server 120*b* can choose which of the HSMs 135*d-f* is used for providing crypto-processing of each of the requested cryptographic objects stored in the persistent layer 130*b*. By balancing the load on each of the HSMs 135 within each of the load balancing pool 145*a,b*, geographic affinity can be improved and latency within the cryptographic object management system 100 can be reduced. In some embodiments, either or both of the object management sites 105*a,b* can include multiple load balancing pools 145 that group different HSMs 135 within the particular object management site 105.

The optional HSM server 140 can be deployed to provide redundancy within the cryptographic object management system 100. It will be appreciated that each of the HSM servers 120*a,b* and optional HSM server 140 is configured to work with a particular load balancing pool 145. For example, the HSM server 120*a* works with the load balancing pool 145*a*. Also, both the HSM server 120*b* and the optional HSM server 140 works with the load balancing pool 145*b*. That is, the number of HSM servers 120*a,b*, 140 is equal to or greater than the number of load balancing pols 145.

The network 110 may alternatively be referred to as the communications network 110. Examples of the network 110 can include, but are not limited to, a local area network (LAN), a wide area network (WAN), the Internet, a wired communication link, or the like. In some embodiments, the object management user interfaces 115, the object manager module 125, and the persistent layers 130 can securely transmit and receive data via the network 110 through a wireless connection using WiFi, Bluetooth, ZigBee or other similar wireless communication protocols. In some embodiments, the object management user interfaces 115, the object manager module 125, and the persistent layers 130 can securely transmit and receive data via the network 110 through a cellular, 3G, 4G, or other wireless protocol. In some embodiments, the object management user interfaces 115, the object manager module 125, and the persistent layers 130 can securely transmit and receive data via a wire line, an optical fiber cable, a Universal Serial Bus "USB" cable, or the like. It is to be appreciated that the object management user interfaces 115, the object manager module 125, and the persistent layers 130 can securely communicate through the network 110 through suitable combinations of the preceding wired and wireless communication methods. In some embodiments, communication between the object management user interfaces 115, the HSM servers 120, the object manager module 125, the persistent layers 130, the HSMs 135, the optional HSM server 140 and the optional HSM proxies 150 can be performed using hypertext transfer protocol (HTTP) or a hypertext transfer protocol secure (HTTPS).

Figure 2A:
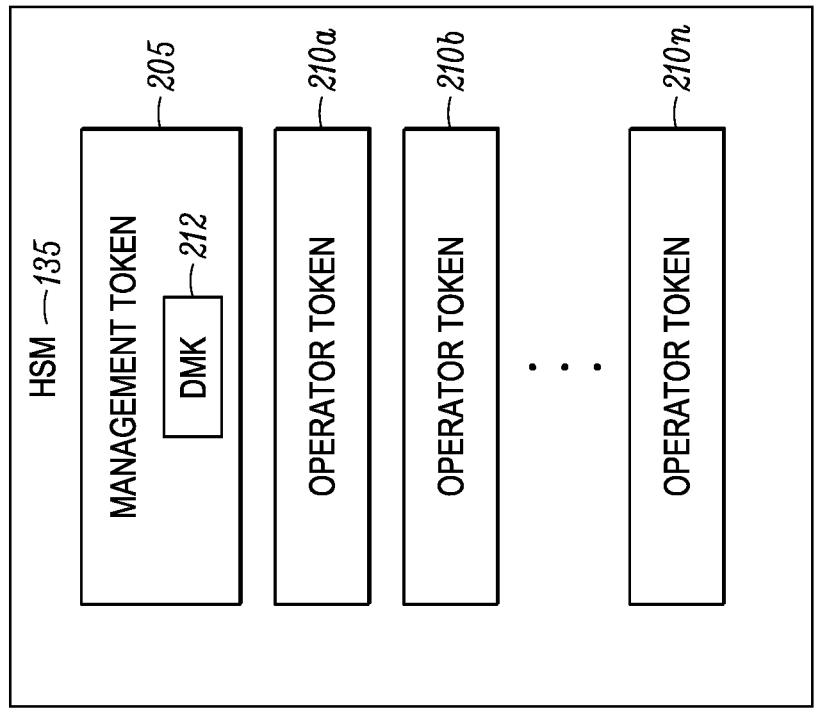
FIGS. 2A and 2B illustrate a schematic diagrams of a HSM and a persistent layer of the cryptographic object management system, according to one embodiment.
Figure 2A:
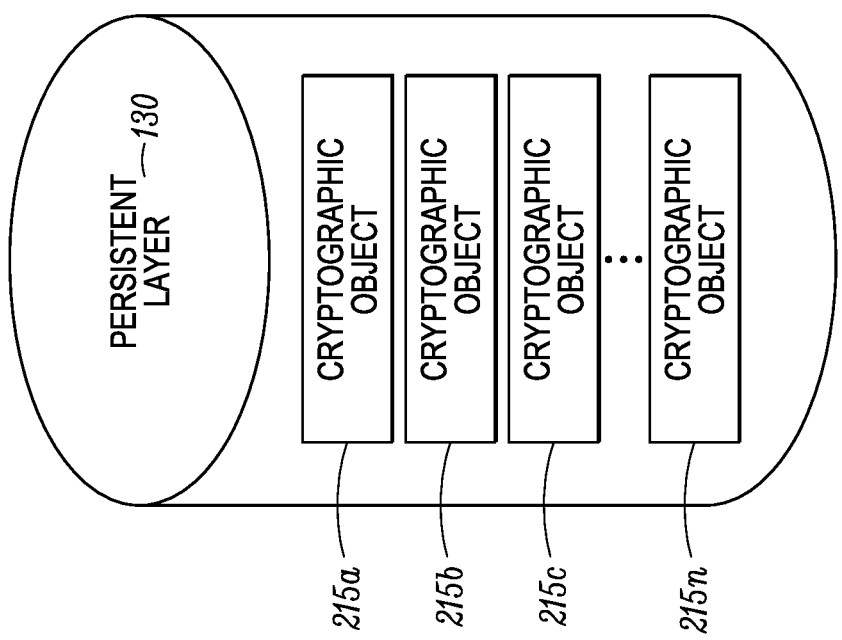
Figure 2B:
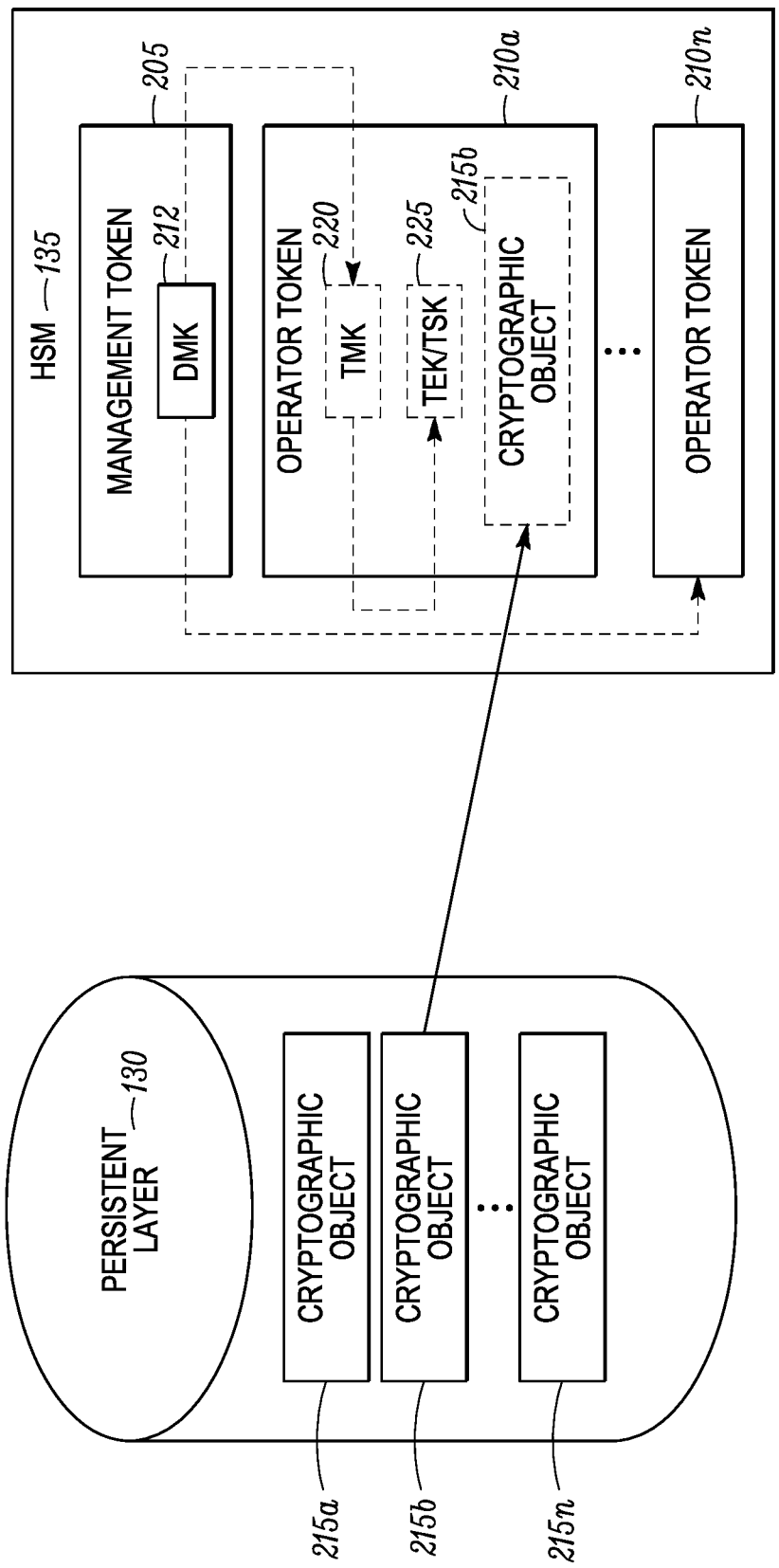

FIGS. 2A and 2B illustrates a schematic diagram of a HSM 135 and a persistent layer 130 of the cryptographic object management system 100, according to one embodiment. As shown in FIG. 2A, the HSM 135 includes a management token 205 and a plurality of operator tokens 210*a-n*. The persistent layer 130 includes a plurality of cryptographic objects 215*a-n* that can be stored as cryptograms. The management token 205 includes a device master key (DMK) 212 that can be used to derive one or more token master keys (TMKs) and the contents of one or more cryptographic tokens that are stored in the persistent layer (e.g., the persistent layers 130*a,b*). The DMK 212 can be shared and stored in each HSM 135 of the cryptographic object management system 100. Each of the one or more operator tokens 210 are internal to the HSM 135 and are configured to operate on a virtual token stored in the persistent layer along with its associated operator groups and the cryptographic objects contained in the virtual token.

Each of the operator tokens 210 can be associated with one or more of the cryptographic objects 215 stored in the persistent layer 130.

During operation of the cryptographic management system 100, when one of the persisted virtual tokens is requested for use by one of the plurality of operator tokens 210, one or more cryptographic objects 215 and/or persisted virtual tokens are transferred from the persistent layer to the operator token 210. The persistent layer securely transmits the requested one or more cryptographic objects 215 to the requesting HSM 135 via an HSM server (e.g., one of the HSM servers 125, 140 shown in FIG. 1). The HSM 135 can then load the requested cryptographic object(s) 215 into the requested operator token 210 where the requested cryptographic object(s) 215 are decrypted based on the DMK 212 to obtain secured data (e.g., personalization financial data) for use by the cryptographic object management system 100. Once the requested cryptographic object(s) 215 are no longer required they are removed from the HSM 135.

FIG. 2B illustrates an example of when the cryptographic object 215b is loaded for crypto-processing in the HSM 135. In this example, the cryptographic object 215b is loaded in the operator token 210a. When the cryptographic object 215b is loaded in the operator token 210, a Token Master Key (TMK) 220 and a Token Encryption Key/Token Signature Key (TEK/TSK) 225 are derived at runtime by the DMK 212. The TMK 220 and the TEK/TSK 225 are used to decrypt the cryptographic object 215b to gain obtain secured data (e.g., personalization financial data) for use by the cryptographic object management system. The TMK 220 is an intermediate key derived from the DMK 212 and is specific to a particular virtual token. The TMK 220 can be used to derive the TEK/TSK 225. A TEK can be used to encrypt persisted cryptographic objects (e.g., cryptographic objects stored in the persistent layer) to help ensure the security of those cryptographic objects. A TSK can be used to sign persisted cryptographic objects to help ensure the integrity of those cryptographic objects. Once the secured data is retrieved, the HSM 135 can remove the cryptographic object 215b.

In some embodiments, the HSM 135 can periodically rotate the TMK 220 and the TEK/TSK 225 for each of the operator tokens 210 by periodically replacing the DMK 212. The key rotation can run in the background while still allowing the cryptographic object management system to operate (e.g., produce EMV documents).

Figure 3:
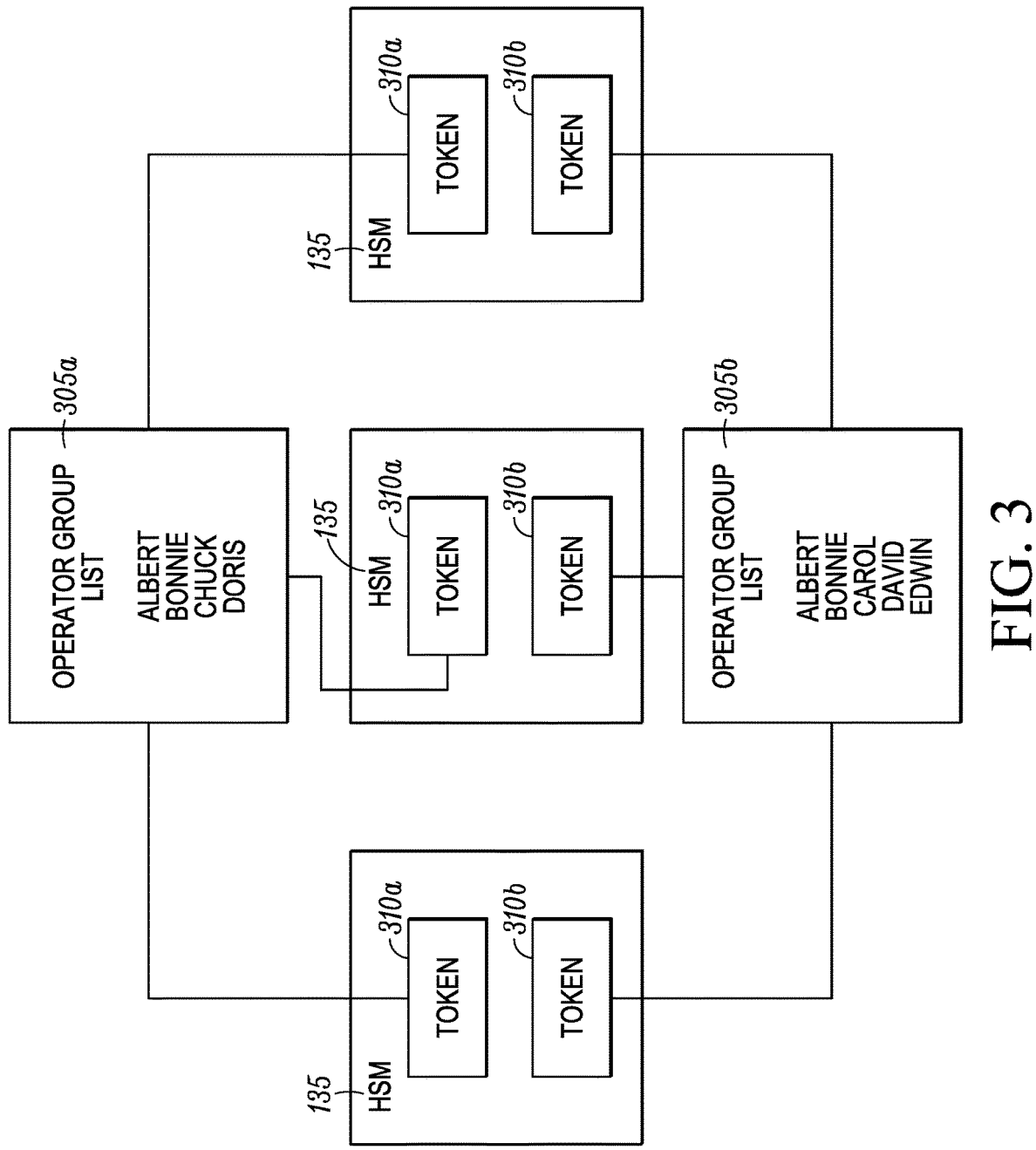
FIG. 3 illustrates a schematic diagram of operator group management within the cryptographic object management system, according to one embodiment.

FIG. 3 illustrates a schematic diagram of operator group management within the cryptographic object management system 100, according to one embodiment. FIG. 3 includes operator group list 305a,b, a plurality of HSMs 135, and tokens 310a,b stored within each of the HSMs 135. The operator group list 305a indicates operators who have access to token 310a. In this embodiment, the operator group list 305a includes operators: Albert, Bonnie, Chuck, and Doris. The operator group list 305b indicates operators who have access to token 310b. In this embodiment, the operator group list 305b includes operators: Arthur, Bonnie, Carol, David and Edwin.

In some embodiments, one or both of the operator group lists 305a,b can be a user group list that indicates users who have access to one or more tokens 310 stored in a persistent layer (e.g., the persistent layers 130a,b shown in FIG. 1). In some embodiments, one or both of the operator group lists 305a,b can be a security officer group list that indicates security officers who have access and have authorization to manage one or more tokens 310 stored in a persistent layer.

In some embodiments, the operator group lists 305a,b can be cryptographic objects that can be stored in a persistent layer. Accordingly, when an object manager (e.g., the object manager module 125 shown in FIG. 1) modifies information of one of the operator group lists 305a,b (e.g., adds a user or security officer to the operator group list; removes a user or security officer from the operator group list; modifies information regarding a user or security officer in the operator group list; etc.), the modification will be present whenever the operator group lists 305a,b are transferred to one of the HSMs 135. This can reduce and prevent cumbersome management of requiring each token of each HSM 135 to be modified when a modification regarding which operators have access to a particular token is changed.

For example, in one instance where there are four HSMs, three tokens per HSM, three users for each token and three security officers for each token, there can be a total of 72 operators to be managed. However, by providing one or more operator group lists in a persistent layer, then number of operators to be managed can be reduced to six (i.e, the three users and the three security officers).

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter.

Accordingly, multiple of the above systems and methods can be used together in a single system or method.

ASPECTS

It is to be appreciated that any of aspects 1-9, 10-13 and 14-18 can be combined.

Aspect 1. A cryptographic object management system comprising:
- a first object management site, wherein the first object management site includes:
  - a plurality of first Hardware Security Modules (HSMs),
  - a first HSM server connected to each of the first HSMs, wherein the first HSM server manages and controls operation of each of the plurality of first HSMs, and wherein the first HSM server includes an object manager module that manages and controls the cryptographic object management system, and
  - a first persistent layer connected to the first HSM server, wherein the first persistent layer stores a plurality of first site cryptographic objects for use by the first HSMs,
  - wherein each of the first HSMs performs crypto-processing on one or more of the plurality of first site cryptographic objects stored in the first persistent layer; and
- a second object management site physically separated from the first object management site, wherein the second object management site includes:
  - a plurality of second HSMs,
  - a second HSM server connected to each of the second HSMs, wherein the second HSM server manages and controls operation of each of the plurality of second HSMs, and
  - a second persistent layer connected to the second HSM server, wherein the second persistent layer stores a plurality of second site cryptographic objects for use by the second HSMs,
  - wherein each of the second HSMs perform crypto-processing on one or more of the plurality of second site cryptographic objects stored in the second persistent layer.

Aspect 2. The system of aspect 1, wherein each of the plurality of first site cryptographic objects and each of the plurality of second site cryptographic objects is one of: a cryptographic token, a cryptographic secret key, a cryptographic public key, a cryptographic private key, a cryptographic certificate, a decimalization table, a weak pin list, and an operator group list.

Aspect 3. The system of either one of aspects 1 and 2, wherein the plurality of first site cryptographic objects and the plurality of second site cryptographic objects are the same.

Aspect 4. The system of any one of aspects 1-3, wherein the object manager module is connected to each of the second HSMs via a network.

Aspect 5. The system of any one of aspects 1-4, wherein the first persistent layer is connected to the second persistent layer via a network, wherein one or more of the plurality of first site cryptographic objects stored in the first persistent layer are replicated in the second persistent layer, and wherein one or more of the plurality of second site cryptographic objects stored in the second persistent layer are replicated in the first persistent layer.

Aspect 6. The system of any one of aspects 1-5, wherein when one of the plurality of first HSMs is instructed to perform crypto-processing on one or more of the plurality of first site cryptographic objects stored in the first persistent layer, the one or more cryptographic objects are transmitted to the first HSM via the first HSM server and temporarily stored in the first HSM until crypto-processing by the first HSM is completed.

Aspect 7. The system of any one of aspects 1-6, wherein the object manager module is configured to edit one or more of the plurality of first site cryptographic objects and one or more of the plurality of second site cryptographic objects,
wherein the object manager module is configured to add a new cryptographic object to at least one of the first and second persistent layers, and
wherein the object manager module is configured to remove one or more of the plurality of first site cryptographic objects and the plurality of second site cryptographic objects.

Aspect 8. The system of any one of aspects 1-7, wherein each of the first HSM server and the second HSM server is at least one of: software loaded onto a preexisting server machine, a server machine preloaded with the software during manufacturing of the server machine, and the software run by one or more virtual server machines, wherein the software manages and controls operation of each of the plurality of HSMs.

Aspect 9. The system of any one of aspects 1-8, wherein the software includes the object manager module.

Aspect 10. A card production system comprising:
- a plurality of Hardware Security Modules (HSMs),
- a HSM server connected to each of the plurality of HSMs, wherein the HSM server manages and controls operation of each of the plurality of HSMs,
- a persistent layer connected to the HSM server, wherein the persistent layer stores a plurality of cryptographic objects for use by the HSMs, and
- a card personalization system operably coupled to the HSM server.

Aspect 11. The card production system of aspect 10, wherein each of the plurality of cryptographic objects is one of: a cryptographic token, a cryptographic secret key, a cryptographic public key, a cryptographic private key, a cryptographic certificate, a decimalization table, a weak pin list, and an operator group list.

Aspect 12. The card production system of any one of aspects 10 and 11, wherein when one of the plurality of HSMs is instructed to perform crypto-processing on one or more of the plurality of cryptographic objects stored in the persistent layer, the one or more cryptographic objects are transmitted to the HSM via the HSM server and temporarily stored in the HSM until crypto-processing by the HSM is completed.

Aspect 13. The card production system of any one of aspects 10-12, wherein the card personalization system is one of a central card issuance system, a desktop card printer, a desktop embosser, a passport system, a desktop laminator, a desktop embosser, a smart card reader, and an input and/or output card hopper.

Aspect 14. A cryptographic object management method comprising:
transferring a cryptographic object stored in a persistent layer to an operator token stored in an HSM;
loading the cryptographic object into the operator token; and
decrypting the cryptographic object within the operator token.

Aspect 15. The cryptographic object management method of aspect 14, wherein the cryptographic object is one of: a cryptographic token, a cryptographic secret key, a cryptographic public key, a cryptographic private key, a cryptographic certificate, a decimalization table, a weak pin list, and an operator group list.

Aspect 16. The cryptographic object management method of any one of aspects 14 and 15, wherein the persistent layer is one of a network storage device and a database.

Aspect 17. The cryptographic object management method of any one of aspects 14-16, further comprising the HSM removing the cryptographic object from the operator token upon decrypting the cryptographic object.

Aspect 18. The cryptographic object management method of any one of aspects 14-17, wherein the cryptographic object is transferred to the operator token via a HSM server.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A cryptographic object management method comprising:
    transferring a cryptographic object stored in a persistent layer to an operator token stored in a Hardware Security Module (HSM);
    loading the cryptographic object into the operator token; and
    decrypting the cryptographic object within the operator token to obtain secured data for use by a cryptographic object management system,
    wherein the HSM is provided within a cloud-computing infrastructure and that the cryptographic object is transferred to the operator token stored in the HSM over a communications network.

2. The cryptographic object management method of claim 1, wherein the cryptographic object is one of: a cryptographic token, a cryptographic secret key, a cryptographic public key, a cryptographic private key, a cryptographic certificate, a decimalization table, a weak pin list, and an operator group list.

3. The cryptographic object management method of claim 1, wherein the persistent layer is one of a network storage device and a database.

4. The cryptographic object management method of claim 1, further comprising the HSM removing the cryptographic object from the operator token upon decrypting the cryptographic object.

5. The cryptographic object management method of claim 1, wherein the cryptographic object is transferred to the operator token via a HSM server.

6. The cryptographic object management method of claim 1, further comprising a card personalization system using the secured data to generate personalization data on an EMV document.

7. The cryptographic object management method of claim 6, wherein the card personalization system is one of a central card issuance system, a desktop card printer, a desktop embosser, a passport system, a desktop laminator, a desktop embosser, a smart card reader, and an input and/or output card hopper.

8. A cryptographic object management system comprising:
    a persistent layer configured to store a cryptographic object; and
    a cloud-computing infrastructure that includes a Hardware Security Module (HSM), wherein the HSM includes an operator token,
    wherein the persistent layer is configured to transfer the cryptographic object to the HSM over a communications network,
    wherein the HSM is configured to load the cryptographic object into the operator token, and
    wherein the cryptographic object is decrypted within the operator token to obtain secured data for use by the cryptographic object management system.

9. The cryptographic object management system of claim 8, wherein the cryptographic object is one of: a cryptographic token, a cryptographic secret key, a cryptographic public key, a cryptographic private key, a cryptographic certificate, a decimalization table, a weak pin list, and an operator group list.

10. The cryptographic object management system of claim 8, wherein the persistent layer is one of a network storage device and a database.

11. The cryptographic object management system of claim 8, wherein the HSM is configured to remove the cryptographic object from the operator token upon decryption of the cryptographic object.

12. The cryptographic object management system of claim 8, further comprising a HSM server, wherein the persistent layer is configured to transfer the cryptographic object to the HSM via the HSM server.

13. The cryptographic object management system of claim 12, further comprising a card personalization system operably coupled to the HSM server, wherein the card personalization system is configured to use the secured data to generate personalization data on an EMV document.

14. The cryptographic object management system of claim 13, wherein the card personalization system is one of a central card issuance system, a desktop card printer, a desktop embosser, a passport system, a desktop laminator, a desktop embosser, a smart card reader, and an input and/or output card hopper.

* * * * *